(12) United States Patent
Kim et al.

(10) Patent No.: US 8,839,899 B2
(45) Date of Patent: Sep. 23, 2014

(54) STRUCTURE OF ENGINE MOUNTING FOR SUPPORTING PITCH AXLE

(75) Inventors: Yong Jin Kim, Gwangmyong-shi (KR);
Yong Joo Kim, Seoul (KR); Hyoung Jin Yoon, Hwasung-shi (KR); Dohyun Kim, Seoul (KR); Heewook Yoon, Suwon-shi (KR); Jung Hwan Bang, Suwon-shi (KR); Kong Sup Jung, Hwasung-shi (KR); Minsup Lee, Yongin-shi (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 24 days.

(21) Appl. No.: 13/561,825

(22) Filed: Jul. 30, 2012

(65) Prior Publication Data
US 2013/0068552 A1 Mar. 21, 2013

(30) Foreign Application Priority Data
Sep. 20, 2011 (KR) .................. 10-2011-0094552

(51) Int. Cl.
*B60K 5/12* (2006.01)
*B60K 5/04* (2006.01)

(52) U.S. Cl.
CPC *B60K 5/1216* (2013.01); *B60K 5/04* (2013.01)
USPC .......................................... 180/300; 180/291

(58) Field of Classification Search
USPC .................... 180/291, 297, 298, 299, 300
See application file for complete search history.

(56) References Cited

U.S. PATENT DOCUMENTS

| | | | |
|---|---|---|---|
| 5,740,876 A * | 4/1998 | Shimose et al. | 180/232 |
| 7,588,117 B2 * | 9/2009 | Fukuda | 180/291 |
| 8,042,793 B2 * | 10/2011 | Igami | 267/292 |
| 2012/0272933 A1 * | 11/2012 | Naritomi et al. | 123/192.1 |

FOREIGN PATENT DOCUMENTS

| | | |
|---|---|---|
| JP | 2697174 B2 | 9/1997 |
| JP | 2005-59806 A | 3/2005 |
| JP | 2005-306373 A | 11/2005 |
| JP | 2007-30577 A | 2/2007 |
| JP | 2007-137421 A | 6/2007 |
| KR | 10-0390089 B1 | 9/2003 |
| KR | 10-2007-0075192 A | 7/2007 |
| WO | WO 2011065426 A1 * | 6/2011 |

* cited by examiner

*Primary Examiner* — John Walters
(74) *Attorney, Agent, or Firm* — Morgan, Lewis & Bockius LLP

(57) ABSTRACT

A structure of engine mounting for supporting a pitch axle in a vehicle may include a front roll mount and a rear roll mount arranged on the pitch axle passing through a powertrain's center of gravity; wherein the weight of an engine is shared by the front roll mount and the rear roll mount.

8 Claims, 7 Drawing Sheets

Traditional Insulator

Stopper Insulator

STRUCTURE OF ENGINE MOUNTING FOR SUPPORTING PITCH AXLE

CROSS-REFERENCE TO RELATED APPLICATION

The present application claims priority to Korean Patent Application No. 10-2011-0094552, filed on Sep. 20, 2011, the entire contents of which is incorporated herein for all purposes by this reference.

BACKGROUND OF THE INVENTION

1. Field of the Invention

The present invention relates to a structure of engine mounting, and more particularly, to a structure of engine mounting, in which the roll mount is installed on a pitch axle, unlike the traditional torque roll supporting method, so that the unbalanced exciting force in the direction of the pitch is offset and the NVH (Noise Vibration Harshness) of the vehicle is improved.

2. Description of Related Art

As the vehicle operates, the noise and the vibration are bound to be created. However, recently, as the technologies applied to vehicles progress and the demand for vibration and noise control among the consumers is increasing, there have been constant attempts to analyze the noise, the vibration and the harshness coming from the vehicle, in order to maximize the comfortability of passengers. Also, interpreting NVH helps come up with criteria to estimate the level of noise and vibration generated as well as of their reduction.

The phenomenon of the vibration generated in the vehicle includes the pitching of the car body when starting or stopping a car, the vibration of the car body when idling, the vibration of the car body and the noise of harshness when the engine runs at a high speed, the vibrations caused by the bumpiness of the road, the pitching of the car body in case of overloading, the impact due to giving the vehicle a rapid change when taking off or shifting gears, and the interference and damage caused by excess displacement. The main cause for such vehicle vibration is the vibration of the engine as well as the impact conveyed from the road while the vehicle is moving.

Examples of the vehicle vibrations are, when the frequency is low (below 20 Hz), the power plant vibration caused by the torque changes, the inertial force and a couple of forces according to the rotation movement of the crankshaft in case of the low-speed revolving of the engine, the vibration of the car body caused by the unbalancedness when the tires are rotating, the vibration of the car body through the suspension according to the profile of the road surface, and the power plant vibration caused by a couple of forces and the thrust due to the joint angle of the actuating system, and when the frequency is high (above 20 Hz), the power plant vibration according to the rotation movement of the crankshaft in case of the high-speed revolving of the engine, the vibration caused by the engagement of the gears inside the transmission, the vibration of the cylinder block at the time of combustion, the vibration of the moving valve system of the engine, the bending vibration and the twisting vibration of the crankshaft, and the bending vibration and the twisting vibration of the power plant.

In order to decrease the vibration of the vehicle mentioned above, various forms of mount have been used, generally being installed between the origin of the vibration such as the engine or transmission of a vehicle and the car body, to control vibration and noise so that they are not conveyed to the car body. Also, a TM mount is used in order to prevent the motive power generated in the engine to be conveyed to the powertrain or the transmission, which results in noise and vibration.

According to the prior art, the torque roll axis supporting method was usually used, and in the torque roll axis supporting method, the powertrain rigid body mode (Roll: powertrain rotation with respect to the X-shaft, Pitch: powertrain rotation with respect to the Y-shaft, Yaw: powertrain rotation with respect to the Z-shaft) is generated in three different directions of X-axis, Y-axis and Z-axis when the engine is accelerated, and the engine mount and the TM mount are set up on the torque roll axis in order to minimize the noise and vibration generated by the powertrain rigid body mode in the vehicle, and the roll mount is loaded on the small part of the engine.

However, the structure of mounting by this torque roll axis supporting method has a huge disadvantage in terms of offsetting the unbalanced exciting force of the pitch element generated besides the roll moment (e.g. rotational force and vibration around the roll axis) when a three-cylinder engine is loaded. In other words, unlike in a four-cylinder engine, the moment element of a three-cylinder engine has the unbalanced exciting force in the directions of Pitch and Yaw, so the structure of the mounting of a three-cylinder engine has disadvantages in terms of reducing the exciting force in comparison to the structure of the mounting of a four-cylinder engine.

Therefore, there is a need to develop a structure for an engine mounting, which can improve the NVH performance by reducing the additional unbalanced exciting force in the direction of Pitch in a three-cylinder engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention was thought out to solve the problems of the traditional art, and, by setting up a roll mount on the pitch axle (Y-axis) of the vehicle engine, it offsets the additional unbalanced exciting force in the direction of pitch, which is generated in the three-cylinder engine, and minimizes the acceleration booming, the engine's take-off noise and the floor vibration, in order to provide a structure of engine mounting which can effectively improve the NVH performance.

In addition, another aspect of the present invention is directed to providing a structure of engine mounting with enhanced riding performance. Forming a side mount that bears the weight of the engine as well as a stopper that does not bear the weight of the engine on the torque roll X-axis of the vehicle's engine would increase the rate of vibration isolation and at the same time would suitably control the displacement of the engine, which occurs while the vehicle is on the road, so that the structure of the engine mounting would have enhanced riding performance.

In an aspect of the present invention, a structure of engine mounting for supporting a pitch axle in a vehicle may may include a front roll mount and a rear roll mount arranged on the pitch axle passing through a powertrain's center of gravity, wherein the weight of an engine is shared by the front roll mount and the rear roll mount.

The front roll mount and the rear roll mount are situated separately on the pitching axle in a longitudinal direction of the vehicle from the center of gravity of the powertrain.

The front roll mount is equipped with a bracket and connected to a center member of the engine and a car body, and the rear roll mount is equipped with a bracket and connected to a sub-frame of the engine and the car body.

A mass is added or deducted from a damper pulley or a drive plate of the engine to change an pitch element to 100%.

A side mount is installed at a point on a torque roll axis of the engine where a distance from the powertrain's center of gravity to the side mount is closer to a pivot point of the engine, and the side mount supports the weight of the engine.

The side mount is a TM mount.

A stopper is installed at a point on the torque roll axis where a distance from the powertrain's center of gravity to the stopper is farther, and the stopper does not support the weight of the engine.

The stopper is an engine mount.

The engine is a three-cylinder engine.

According to the structure of engine mounting of the present invention, by setting up the roll mount in the pitch axle (Y-axis) of the vehicle engine, the exciting force of the torque roll axis (X-axis) can be offset to minimize the idling vibration, which results in the effective improvement of the NVH performance.

In addition, the present invention achieves enhanced riding performance, which can increase its rate of vibration isolation by having a side mount that bears the weight of the engine as well as a stopper that does not bear the weight of the engine on the torque roll X-axis of the vehicle's engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
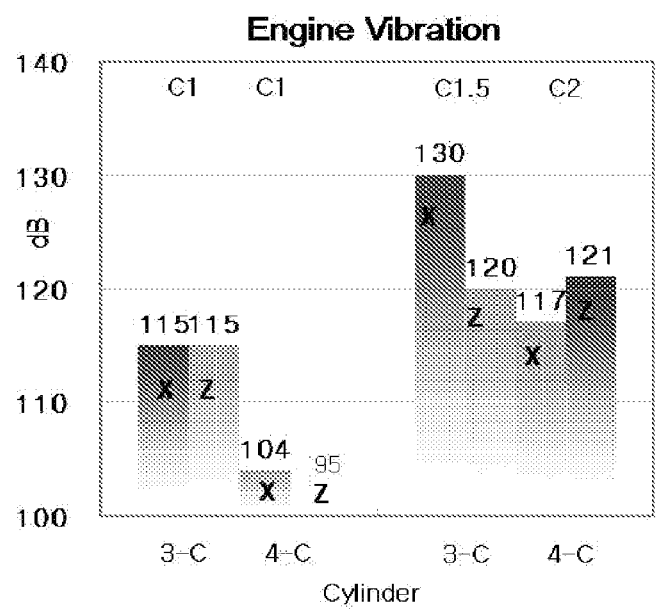
FIG. 1 is a graph comparing the vibrations of a three-cylinder engine and those of a four-cylinder engine, both of which are designed according to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereafter, with reference to the attached drawings, the exemplary embodiment of the present invention will be described in detail. Before proceeding, it should be noted that the terminologies and words used on this specification and in the claims are not to be interpreted solely as the general or dictionary meanings, and they should be interpreted as the meanings and the concept which correspond with the technological ideas of the present invention based on the principle that the inventor can properly define the concept of the terminologies in order to explain his own invention in the best possible way. Therefore, the compositions described in the embodiments and the drawings of this specification are merely the most preferred types of embodiment and they do not represent the entire technological ideas of the present invention, and thus, it should be understood that there can be a variety of equivalents and alterations, which can replace these embodiments at the time of filing this application.

For the improvement of the idle vibration of the three-cylinder engine, the present invention excludes the traditional pendulum system used mainly in small-sized vehicles and suggests a structure of mounting for supporting pitch axle, which supports the pitch axle of the engine.

The structure of mounting for supporting pitch axle can 1) have the two mounts, which share the weight of the engine with each other, set up in the front and rear side of the pitch axle of the engine but they are arranged so that the separation distance between them is minimal, 2) be equipped with one additional mount, which supports the weight of the engine from the torque roll axis of which the distance from the engine's center of gravity to the left/right side members of the vehicle is short, 3) change the excitation component of the engine to pitch moment 100% by adding a mass to the damper pulley or the drive plate, and 4) have the composition in a way that controlling the larger displacement is possible while the vehicle is on the road by forming a stopper structure, which does not support the weight of the engine, on the torque roll axis on the opposite side of the above single mount additionally installed, depending on the need of the invention.

FIG. 1 is a graph comparing the vibrations of a three-cylinder engine and those of a four-cylinder engine, both of which are designed according to the prior art.

Recently, as the sales of small-sized cars increases, three-cylinder engines are becoming more popular than four-cylinder engines. As you can see from FIG. 1, if you compare the vibrations of a three-cylinder engine with those of a four-cylinder engine, in case of C1 vibration comparison, a three-cylinder engine is inferior to a four-cylinder engine in the direction of X-axis by more than 10 db, and even in case of comparing C2 of a four-cylinder engine with C1.5 of a three-cylinder engine, a three-cylinder engine is inferior to a four-cylinder engine in the direction of X-axis by more than 13 db.

As such, in comparison to the four-cylinder engine, the main weakness of the three-cylinder engine can be the idle vibration in the aspect of NVH, and this results from the exciting force by the pitch moment and the yaw moment, which are the power-train rotation moment in respect to the Y-axis and the Z-axis respectively, and both of these moments are a C1 component of the engine.

Ordinarily, a three-cylinder engine comes with the pitch moment and the yaw moment coupled fifty-fifty, so the present invention was designed based on the need for discriminated actions to be taken against such additional exciting forces other than C1.5 roll moment, the major excitation component.

Figure 2:
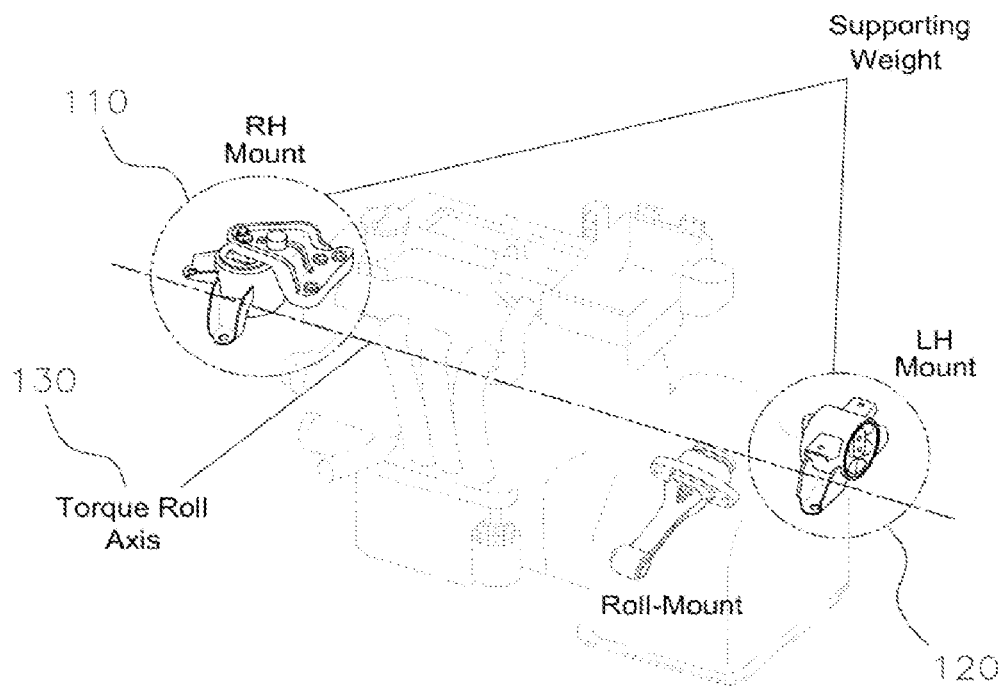
FIG. 2 is an illustration of a structure of engine mounting with the pendulum system of prior art.

FIG. 2 is an illustration of a structure of engine mounting with the pendulum system of prior art.

As you can see from FIG. 2, in a structure of engine mounting with the pendulum system, the engine and the power transmission are supported by a RH Mount (Right Head Mount) 110 and a LH Mount (Left Head Mount) 120, both of which are formed on the torque roll axis 130, which is formed in the direction of the X-axis. And the engine and the power transmission are supported by a roll mount 120' installed in the lower part of the engine, speaking in terms of the direction of the Y-axis, which is the direction of the longitude of the vehicle.

The role of the roll mount 120' is to control the conveyance of the vibration generated in the direction of the rolling of the engine and the power transmission, but there was a disadvantage in that, with just one roll mount 120' installed on a small part of the engine, it was not possible to decrease the vibration in the direction of the X-axis.

Also, in a vehicle where a structure of engine mounting such as this one was applied, the vibration from the engine was conveyed to the sub-frame through a roll mount 120' with small vibration isolation when accelerating. And this vibration was conveyed to the car body without the vibration isolation, resulting in the booming noise inside the vehicle, which was another disadvantage.

Figure 3:
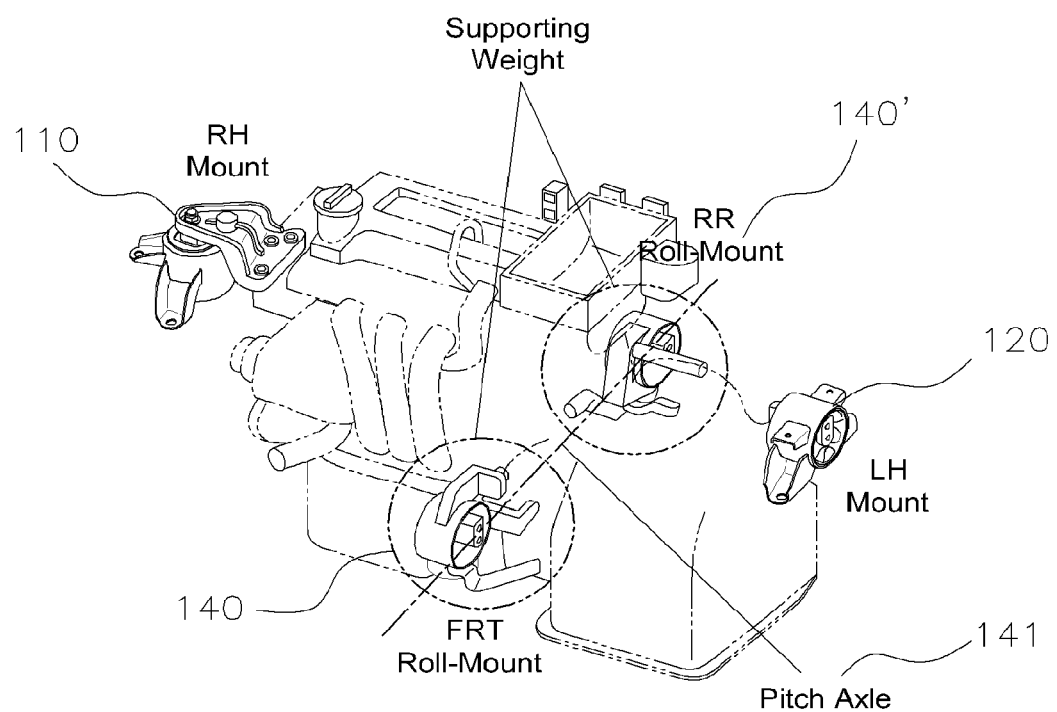
FIG. 3 is a schematic diagram of a structure of engine mounting for supporting the pitch axle according to an exemplary embodiment of the present invention.

FIG. 3 is a schematic diagram of a structure of engine mounting for supporting the pitch axle according to an exemplary embodiment of the present invention.

The structure of engine mounting for supporting pitch axle based on the present invention is characterized in that it is equipped with a front roll mount 140 and a rear roll mount 140', which are arranged on both ends of the vehicle's pitching axle 141, and the weight of the engine is supported by the front roll mount 140 and the rear roll mount 140'.

The front roll mount 140 and the rear roll mount 140' can be composed of a bracket and an insulator so that it is easy to install and uninstall them from the equipped vehicle. The rubber characteristics of the roll mount depend on the spring constant, damping characteristics and installation angle of the rubber, and as the spring constant becomes smaller and as the damping value becomes larger, they can work for the vibration noise of the vehicle, and however, if the spring constant is too small, it can work against the movement of the engine and the noise at the time of accelerating. Hence, the spring constant must be set appropriately in consideration of the displacement and the engine torque.

The front roll mount 140 can be connected to the center member of the engine and the car body, and the rear roll mount 140' can be equipped with a bracket 160' and be connected to the sub-frame of the engine and the car body.

In an exemplary embodiment of the present invention, in order to decrease the yaw moment, an additional mass can be added to or deducted from a damper pulley 230 or a drive plate 220. Thus, if an additional mass is added to or deducted from a damper pulley 230 or a drive plate 220, the pitch moment and the yaw moment, which are interconnected to each other in 50-50 rate, are changed into a 100% pitch model element. In other words, because of the increase in the moment of the X-axis, the moment in the direction of the X-axis will be reduced.

One of the two ends of the torque roll axis 130 is closer to the pivot point 190 of the engine, and the side mount, which supports the weight of the engine, can be additionally equipped on it. For example, a TM mount can be arranged to support the weight of the engine and work as a side mount.

To the contrary, a stopper, which does not support the weight of the engine, can be additionally arranged on the other end of the torque roll axis 130, which is farther from the pivot point 190 of the engine. In other words, an engine mount 180, which does not support the weight of the engine, can be set up to work as a stopper, and in this case, controlling the larger displacement is possible without influencing the idle vibration while the vehicle is on the road.

Therefore, in an exemplary embodiment of the present invention, a front roll mount 140 and a rear roll mount 140', which are the main mounts, support the weight of the powertrain, and the side mount, which can include a TM Mount 170, shares the weight of the powertrain, and a stopper, which can include an engine mount, can be installed in order to control the roll displacement of the engine the movement of the engine generated when accelerating or decelerating in case of the front transverse powertrain is mounted.

Also, in an exemplary embodiment of the present invention, a front roll mount 140 and a rear roll mount 140', which are the main mounts, should be formed on the pitch axle in a way that their separation distance is minimal, and by damping or supporting the pitch moment of the powertrain, the NVH can be reduced.

Figure 4:
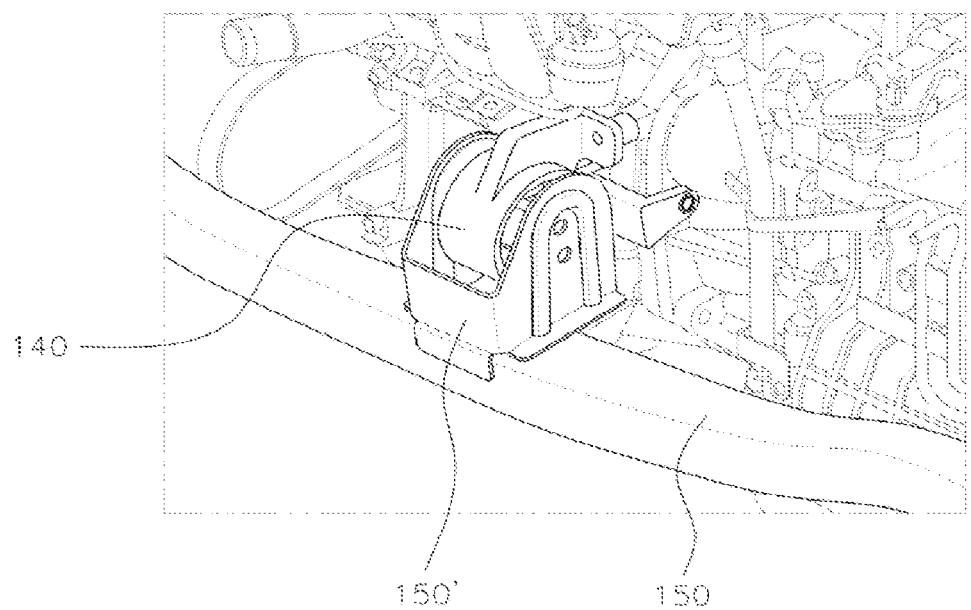
FIG. 4 is an illustration showing a front roll mount, engine and a center member, all connected to each other according to an exemplary embodiment of the present invention.

FIG. 4 is an illustration showing a front roll mount, engine and a center member all connected to each other according to an exemplary embodiment of the present invention.

The front roll mount 140 can be connected to the center member 150 of the engine and the car body using a bracket 150' in the front part of the pitch axle of a powertrain. However, the possibilities are not limited to such structure, and the structure may take a form of having a T member arranged in the direction of the overall length of the vehicle to support the front roll mount 140, depending on the need of the invention.

Figure 5:
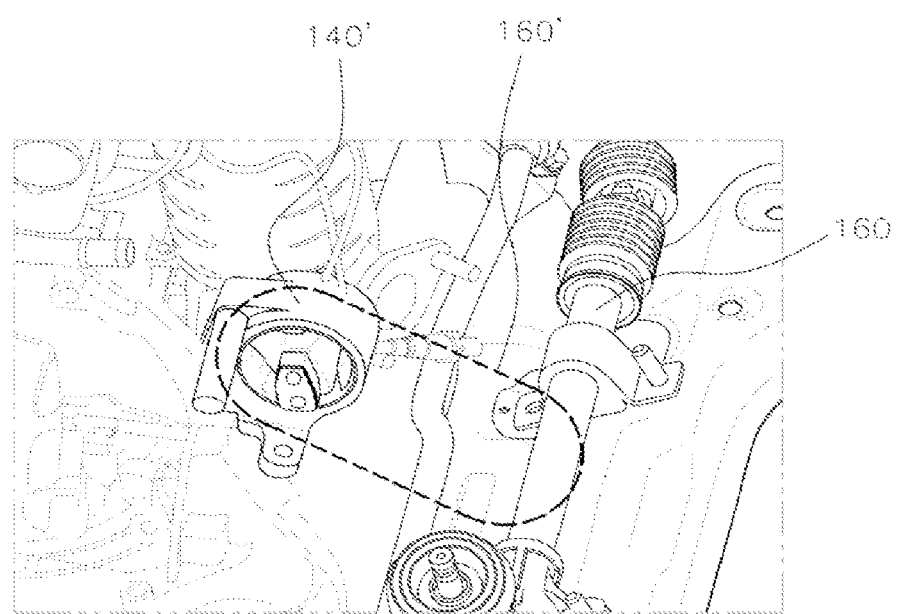
FIG. 5 is an illustration showing a rear roll mount, engine and a sub-frame, all connected to each other according to an exemplary embodiment of the present invention.

FIG. 5 is an illustration showing a rear roll mount, engine and a sub-frame all connected to each other according to an exemplary embodiment of the present invention.

In the case of a rear roll mount 140', a rear roll mount 140' is connected to the rear part of the pitch axle of the powertrain, and a support bracket is arranged on one side of a sub-frame 160 for supporting the rear roll mount 140'. However, the possibilities are not limited to such structure, and the structure may take a form of having a center member arranged in the direction of the longitude of the vehicle to support the rear roll mount 140', depending on the need of the invention.

Figure 6:
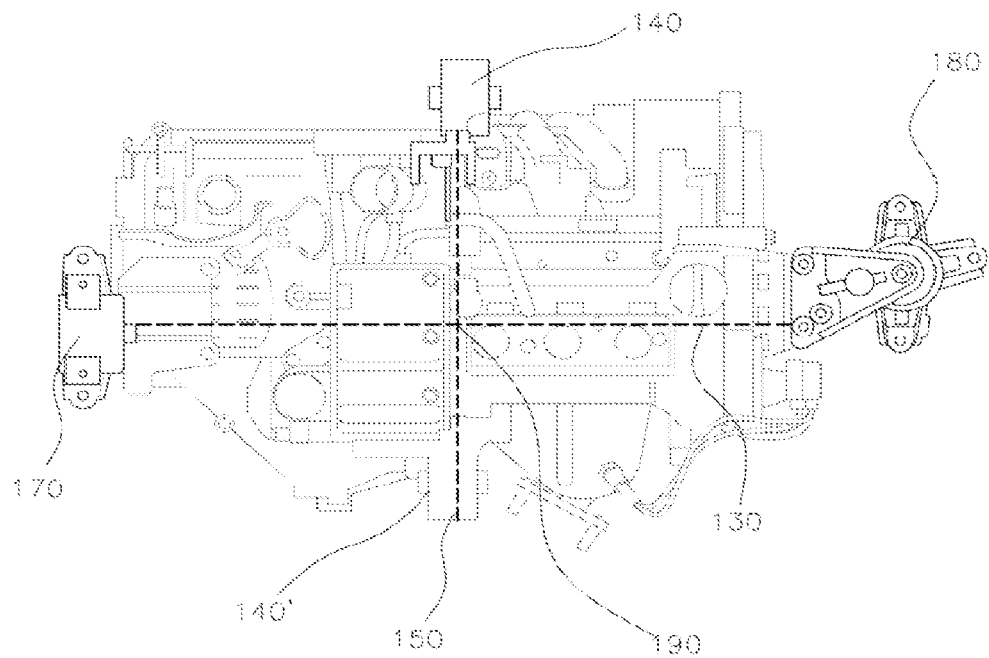
FIG. 6 is a schematic diagram of a structure of engine mounting for supporting the pitch axle equipped with additional TM mounts and engine mounts according to an exemplary embodiment of the present invention.

FIG. 6 is a schematic diagram of a structure of engine mounting for supporting the Pitch axle equipped with more TM mount and the engine mount according to an exemplary embodiment of the present invention.

As described above, if the main weight of the powertrain is shared by the front roll mount 140 and the rear roll mount 140', which are the main mounts, the side mount, which supports the remaining small amount of weight, can be installed in the engine or the TM. At this time, a mount close to the powertrain or the center of gravity of the engine should be selected and a side mount can be added to it. This is to lower and control the powertrain rigid body mode.

For instance, it is preferred that the spring property of the TM mount is set as "soft" in the direction of up-and-down in order to insulate the exciting force caused by the pitch moment. Also, the side mount can be connected to the side mount of the car body.

Figure 7:
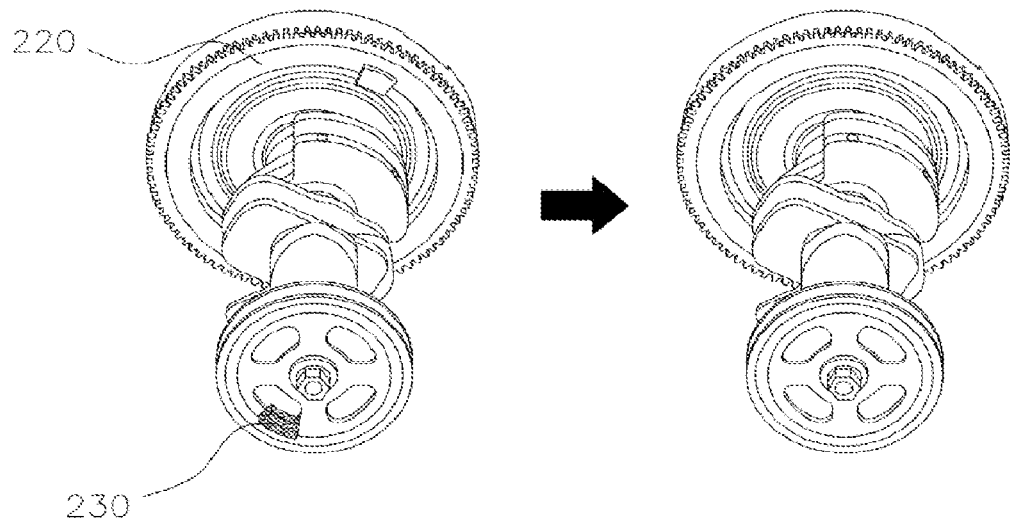
FIG. 7 is an illustration showing a damper pulley, crank shaft and a drive plate of the engfine, according to an exemplary embodiment of the present invention.

FIG. 7 is an illustration showing a damper pulley, crank shaft and a drive plate of the engine, according to an exemplary embodiment of the present invention.

In general, C1 excitement component of the three cylinder engine comes with the pitch moment and the yaw moment coupled fifty-fifty, but in an exemplary embodiment of the present invention a mass is added to a damper pulley 230 or a drive plate 220 of the engine in order to suppress the roll moment and induce the pitch moment only.

In other words, if the yaw moment is suppressed in order to induce only the pitch moment, it will be easy to suppress the moment applied along the torque roll axis and the engine's NVH can be reduced when the engine is idle.

Figure 8:
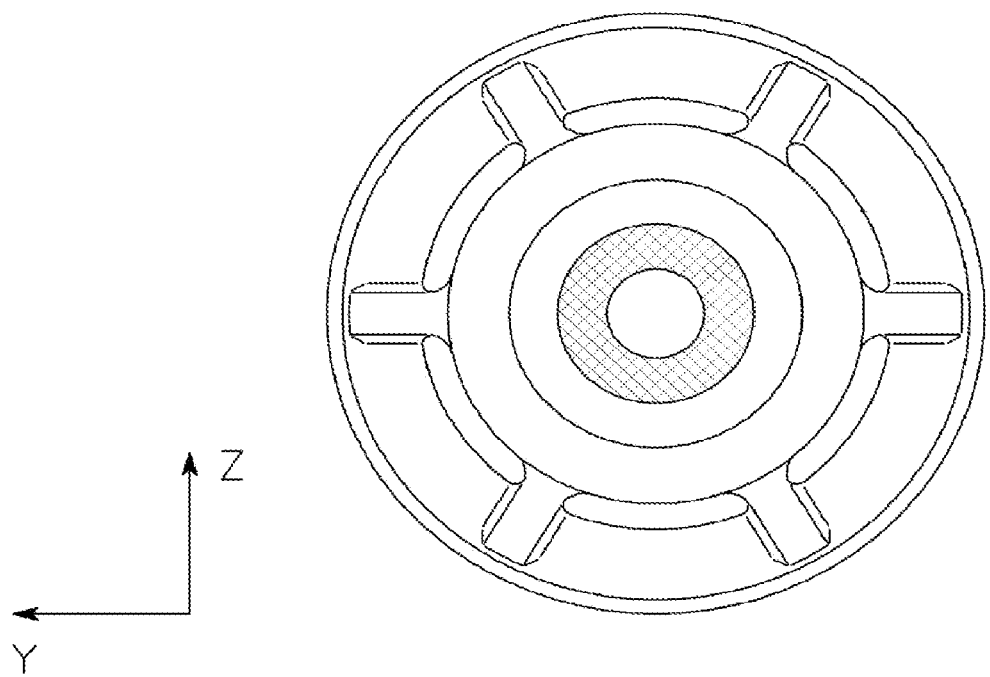
FIG. 8 is an illustration showing the insulator of a stopper according to an exemplary embodiment of the present invention.
Figure 9:
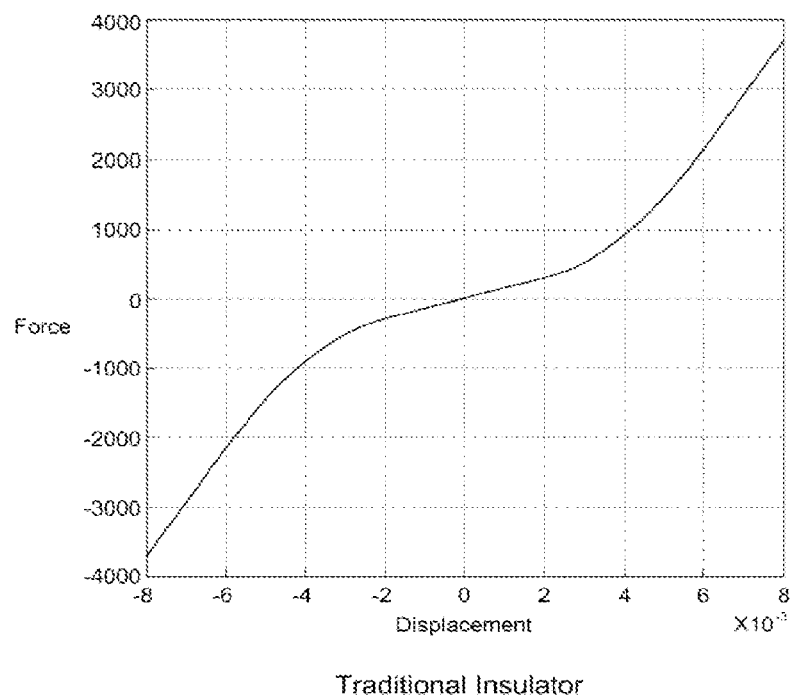
FIGS. 9 to 10 are illustrations showing the idle property of the insulator of the stopper according to the prior art and an embodiment of the present invention.
Figure 10:
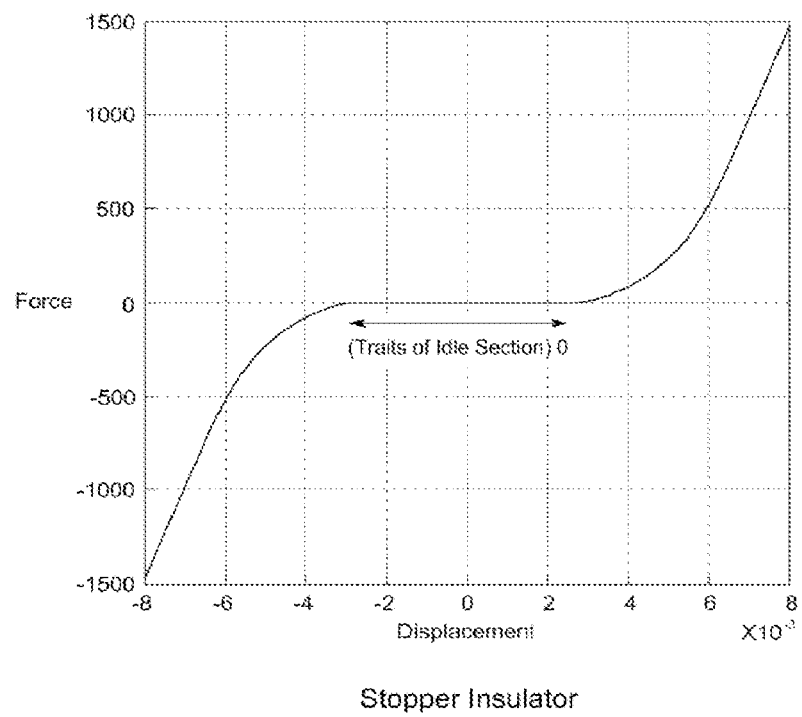

FIG. 8 is an illustration showing the insulator of a stopper according to an exemplary embodiment of the present invention.

As described above, in an exemplary embodiment of the present invention, one mount, which does not support the weight of the powertrain, is added on the opposite side of where the side mount that is connected to the side member is so that it does not contribute to the idle vibration, but the present invention can also be equipped with just one stopper purely for controlling the larger displacement while the vehicle is on the road.

In an exemplary embodiment of the present invention, it is preferred that that the present invention is designed in a way that the stopper is separated from an inner pipe so that it is not affected by the weight at the time of the stopper insulator static movement, i.e., it does not have any contributions in terms of spring characteristics when the engine is idle and that the powertrain's large movements are suppressed.

The stopper does not have to be added in consideration of the production cost and the weight when the powertrain's movement is not large.

The foregoing descriptions of specific exemplary embodiments of the present invention have been presented for purposes of illustration and description. They are not intended to be exhaustive or to limit the invention to the precise foams disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications within the spirit of the invention and scope of the Claims to be defined below.

What is claimed is:

1. A structure of engine mounting for supporting a pitch axis in a vehicle comprising:
   a front roll mount and a rear roll mount arranged on the pitch axis passing through a powertrain's center of gravity;
   wherein a weight of an engine is shared by the front roll mount and the rear roll mount,
   wherein a side mount is installed at a point on a torque roll axis of the engine where a first distance from the powertrain's center of gravity to the side mount is closer to a pivot point of the engine than a second distance from the powertrain's center of gravity to an end of the torque roll axis, and the side mount supports the weight of the engine.

2. The structure of engine mounting for supporting a pitch axis of claim 1, wherein the front roll mount and the rear roll mount are situated separately on the pitching axis in a longitudinal direction of the vehicle from the center of gravity of the powertrain.

3. The structure of engine mounting for supporting the pitch axis of claim 1, wherein the front roll mount is equipped with a bracket and connected to a center member of the engine and a car body, and the rear roll mount is equipped with a bracket and connected to a sub-frame of the engine and the car body.

4. The structure of engine mounting for supporting the pitch axis of claim 1, wherein a mass is added or deducted from a damper pulley or a drive plate of the engine.

5. The structure of engine mounting for supporting the pitch axis of claim 1, wherein the side mount is a transmission mount.

6. The structure of engine mounting for supporting the pitch axis of claim 1, wherein a stopper is installed at a point on the torque roll axis where a distance from the powertrain's center of gravity to the stopper is farther from the pivot point of the engine than the first distance, and the stopper does not support the weight of the engine.

7. The structure of engine mounting for supporting the pitch axis of claim 6, wherein the stopper is an engine mount.

8. The structure of engine mounting for supporting the pitch axis of claim 1, wherein the engine is a three-cylinder engine.

* * * * *